United States Patent [19]

Meijer et al.

[11] Patent Number: 5,006,729
[45] Date of Patent: Apr. 9, 1991

[54] DEVICE FOR DOUBLING THE FREQUENCY OF A LIGHT WAVE COMPRISING A NON-LINEAR OPTICAL COMPOUND

[75] Inventors: Egbert W. Meijer, Eindhoven; Wolter Ten Hoeve, Eelde; Sjef Nijhuis, Eindhoven; Gerardus L. J. A. Rikken, Eindhoven; Edsko E. Havinga, Eindhoven, all of Netherlands

[73] Assignee: U.S. Philips Corporation, New York, N.Y.

[21] Appl. No.: 513,743

[22] Filed: Apr. 24, 1990

[30] Foreign Application Priority Data

Apr. 27, 1989 [NL] Netherlands ............... 8901069

[51] Int. Cl.$^5$ .................. H03F 7/00; G02B 6/00; C08F 26/06; B32B 9/04
[52] U.S. Cl. .................. 307/425; 350/96.34; 526/265; 428/411.1
[58] Field of Search ............ 350/96.12, 96.14, 96.34, 350/370, 374, 355, 377; 428/411.1; 526/265, 263; 307/425, 426, 427; 264/1.1, 1.3, 1.7

[56] References Cited

U.S. PATENT DOCUMENTS

| 4,659,177 | 4/1987 | Choe et al. | 350/96.34 |
| 4,792,208 | 12/1988 | Ulman et al. | 350/96.34 |
| 4,801,670 | 1/1989 | DeMartino et al. | 350/96.34 |

FOREIGN PATENT DOCUMENTS

| 0313474 | 4/1989 | European Pat. Off. | 350/96.12 |
| 0313475 | 4/1989 | European Pat. Off. | 350/96.12 |
| 0313476 | 4/1989 | European Pat. Off. | 350/96.12 |
| 0313477 | 4/1989 | European Pat. Off. | 350/96.12 |

Primary Examiner—Akm Ullah
Attorney, Agent, or Firm—Norman N. Spain

[57] ABSTRACT

Nonlinear optical compound, nonlinear optical medium, method of manufacturing a nonlinear optical medium and device for doubling the frequency of a light wave. The invention relates to a nonlinear optical medium and a device comprising such a nonlinear optical medium which can be suitably used to double the frequency of red light, while forming blue light. The nonlinear optical medium comprises a polymer matrix and nonlinear optical compounds which contain a substituted sulphone group as the electron-acceptor group.

5 Claims, 7 Drawing Sheets

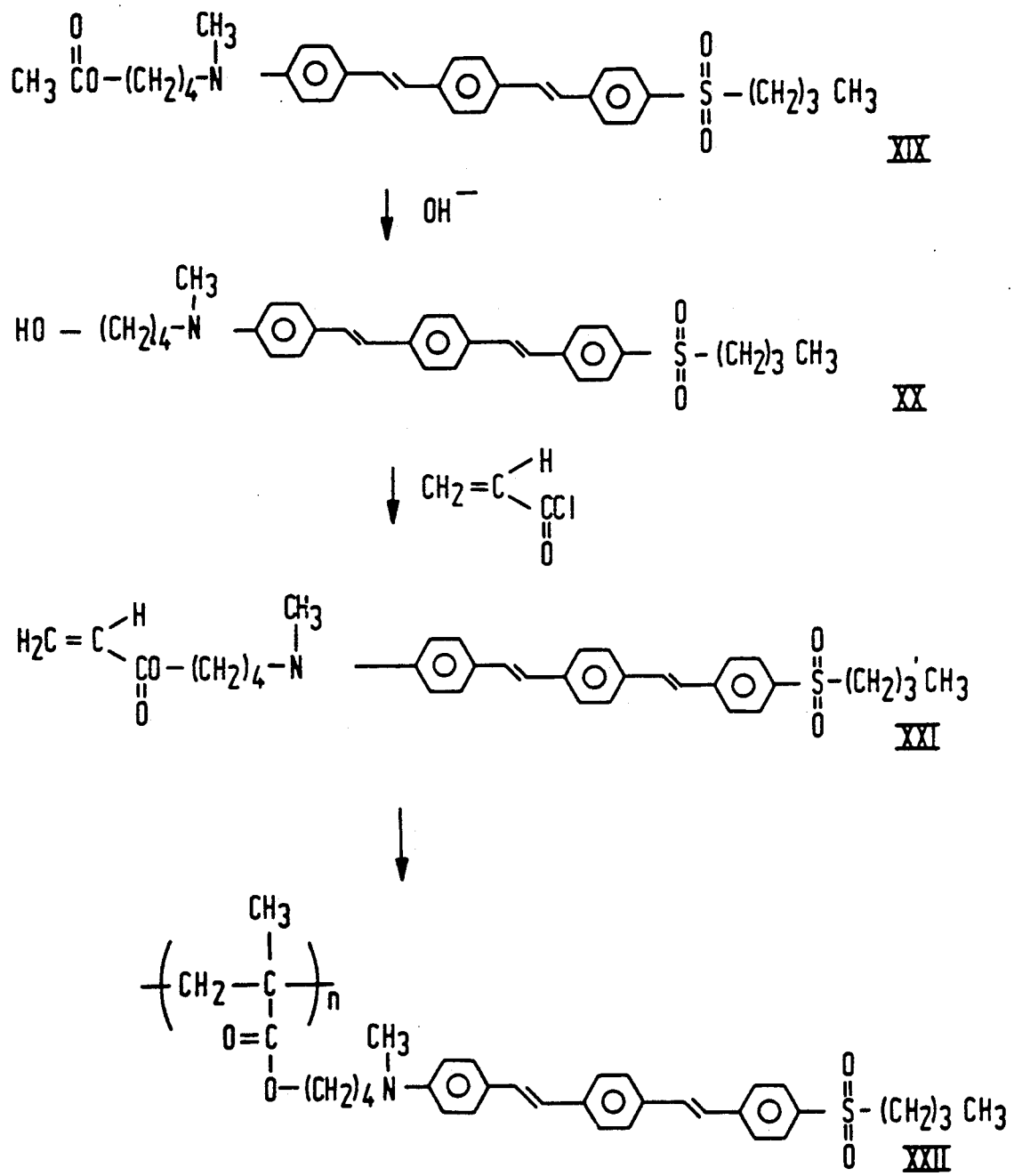
FIG.2 (II)

DEVICE FOR DOUBLING THE FREQUENCY OF A LIGHT WAVE COMPRISING A NON-LINEAR OPTICAL COMPOUND

BACKGROUND OF THE INVENTION

The invention relates to a nonlinear optical compound which comprises an electron donor group and an electron acceptor group which are linked by a $\pi$-conjugated system.

The invention also relates to a nonlinear optical medium which comprises a polymer matrix and polarly ordered nonlinear optical compounds, said nonlinear optical compounds comprising an electron donor group and an electron acceptor group which are linked by a $\pi$-conjugated system.

The invention further relates to a method of manufacturing a nonlinear optical medium.

The invention also relates to a device for doubling the frequency of a light wave, a fundamental light wave being led through a nonlinear optical medium, so as to form a second harmonic wave.

Such a compound and a device in the form of a planar waveguide are described in European Patent Application EP 254921, in which a fundamental light wave is generated by means of an YAG laser having a wavelength of 1064 nm. Crystalline methylnitroaniline (MNA) is used as the nonlinear optical compound. By means of the device, green light having a wavelength of 532 nm is obtained. The light wave thus obtained, whose frequency is doubled, is called second harmonic wave.

Another known nonlinear optical compound is 4-dimethylamino-4'-nitrostilbene (abbreviation: DANS). Compounds such as MNA and DANS are called D$\pi$A compounds, wherein D denotes an electron donor group such as an amino group, A denotes an electron acceptor group such as a nitro group and $\pi$ denotes a $\pi$-conjugated system such as a benzene ring. Nonlinear optical (NLO) effects which can be generated with such compounds are the electrooptical effect (Pockels effect) on which electrooptical switches are based and frequency-doubling of laser light. At molecular level, the NLO effect is characterized by the hyperpolarisability $\beta$; at a macroscopic level (many molecules) the NLO effect is characterized by second order nonlinear optical susceptibility $\chi^{(2)}$. Non-NLO compounds have a value $\beta=0$. Only compounds having a high value of $\beta$ are important in NLO applications. At macroscopic level the same applies to $\chi^{(2)}$. The above-mentioned D$\pi$A compounds have a relatively high $\beta$ value.

A disadvantage of the above-mentioned and many other NLO compounds is that they are unsuitable for doubling the frequency of laser light having a wavelength of approximately 800 nm, because these compounds exhibit a considerable absorption for wavelengths having a double frequency, i.e., a frequency of approximately 400 nm. As a result, the output of blue laser light in nihil. In practice there is a substantially need for blue laser light, for example, in the field of optical recording. Blue light can be focused more sharply than red light because the size of the focus decreases with shorter wavelengths. In the case of optical recording, the information density increases by a factor of four when blue light is used instead of red light. Also in the case of photochemical processes, blue laser light is more interesting than red laser light because of the larger photochemical activity of blue light.

The above-mentioned compounds can, however, be used to generate second harmonic light waves having a wavelength above approximately 530 nm (green), and in applications for electrooptical switches for wavelengths of, for example, 800 nm, 1.06 $\mu$m, and 1.3 $\mu$m.

SUMMARY OF THE INVENTION

One of the objects of the invention is to reduce the minimum wavelength which can be frequency-doubled, and to provide, inter alia, a NLO compound which can be suitably used to double the frequency of laser light having a wavelength of approximately 800 nm, as emitted by a GaAs-laser, while forming blue laser light having a wavelength of approximately 400 nm. Such a compound exhibits a very small absorption both at 800 nm and at 400 nm.

According to the invention, this object is achieved by a NLO compound as described in the opening paragraph, which compound is characterized in that the electron acceptor group is a sulphone group which comprises a substituent selected from the group formed by alkyl, hydroxyalkyl and alkyl(meth)acrylate. Such compounds have the following formula

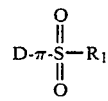

In this formula, D and $\pi$ have the above-mentioned meaning and $R_1$ represents one of the said substituents. The use of such a sulphone group as an electron-acceptor group has the advantage relative to a nitro group that the absorption band is shifted to shorter wavelengths, while maintaining a high value of $\beta$. In addition, relatively narrow absorption bands are obtained. Consequently, such a compound can be made transparent at least in the wavelength range between 400 and 800 nm. A further advantage is the satisfactory solubility in other polymers with which layer structures in the form of waveguides can be manufactured. By varying the substituent $R_1$, the properties of such compounds can be influenced, for example the location of the absorption band, the dipole moment, the value of $\beta$ and the solubility. The nitro group does not have such a substituent and, consequently, it does not have the possibility to influence the properties of the NLO compound. The dipole moment is important for the orientation (called poling) of the NLO compounds in a polymer matrix by means of an electric field. The orientation process is necessary to obtain a non-centrosymmetrical order of the NLO molecules in a polymer matrix. The resulting polar order of the NLO molecules brings about a high value of $\chi^{(2)}$. The poling operation is carried out by heating the polymer matrix to a temperature above the glass-transition temperature, after which the dissolved NLO molecules are oriented inn a strong electric field. After the composition has been ordered, it is frozen-in by cooling to room temperature, the electric field being maintained during cooling. In an article by D. J. Williams in Angew. Chem. 96 (1984)637–651 a description is given of poling and further NLO compounds are listed.

Alkyl groups which can be suitably used as substituents are $C_1$-$C_{10}$ alkyl groups. The number of carbon atoms of the alkyl group is not critical, however, when the number of carbon atoms increases the NLO effect per molar mass decreases.

Reactive substituents $R_1$ such as alkyl(meth)acrylate enable the NLO compound to be bonded to the polymer chains of a matrix in a covalent manner. By bonding the NLO molecules to the polymer matrix in a covalent manner, the advantage is obtained that the concentration of NLO molecules can be increased considerably relative to a solution of NLO molecules in a polymer matrix. In the latter case, mostly a concentration of maximally 5% by weight can be attained. Such NLO compounds comprising an alkyl(meth)acrylate group can be polymerised by themselves to form a (meth)acrylate main chain having NLO side groups. In principle, each monomer unit of the polymer chain can be bonded to such a NLO molecule in a covalent manner, which leads to a high concentration of NLO molecules in the polymer matrix. A suitable polymer main chain is formed by, for example, the class of poly(meth)acrylates, which is a polymer having favourable optical properties and which is transparent at least in the wavelength range from 400 to 800 nm. When the substituent $R_1$ of the sulphone group of the NLO compound is an alkyl(meth)acrylate group, the NLO compound can be copolymerised with a specific quantity of methylmethacrylate monomers to form a polymer chain of PMMA having NLO molecules which are bonded in a covalent manner as side groups.

As described above, the number of carbon atoms of both the hydroxy-alkyl substituent and the alkyl(meth)acrylate substituent is non-critical. Suitable substituents are, for example, $C_1$-$C_6$ hydroxy-alkyl substituents and $C_1$-$C_6$ alkyl(meth)acrylate substituents.

A suitable embodiment of the NLO compound according to the invention is characterized in that the electron donor group is a group as shown in formula 2 —O—$(CH_2)n$—O—$R_2$, wherein n is an integer having a value of at least 1 and $R_2$ is a substituent selected from the group formed by hydrogen and (meth)acrylate. As has been described hereinabove, a (meth)acrylate substituent enables copolymerisation of the NLO compounds with, for example, (meth)acrylate monomers, or polymerisation of the NLO compounds by themselves to form a (meth)acrylate main chain having NLO side groups (see, for example, formula VII of FIG. 1). The value of n is not critical and may range from, for example, 1 to 6. In general, higher values of n reduce the NLO effect per molar mass. If desirable, the substituent $R_2$ may also be an inert substituent such as an alkyl group or an acetyl group. Another suitable electron-donor group is, for example an alkoxy group having, for example 1–6 C-atoms.

An additional embodiment of the NLO compound according to the invention is characterized in that the electron-donor group is an amino group according to formula 3

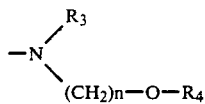

wherein n is an integer having a value of at least 1, $R_3$ is a substituent selected from the group formed by hydrogen and alkyl, and $R_4$ is a substituent selected from the group formed by hydrogen and (meth)acrylate. The alkyl group is, for example a methyl group or an ethyl group and n has a value of, for example, 1–4. Longer alkyl groups and higher values of n are also possible, however, this would lead to a radiation of the NLO effect per molar mass. By selecting a reactive end group uch as (meth)acrylate as the substituent $R_4$, it becomes possible to bond the NLO compound to the polymer chains of a matrix in a covalent manner, the advantage hereof being the above-mentioned increase in concentration of NLO molecules. In this case, the NLO molecules can be polymerized by themselves (see, for example, formula XXI of FIG. 2) or they can be copolymerized with (meth)acrylate monomers.

Other suitable electron-donor groups are the monoalkylamino group such as the monomethylamino group and the monoethylamino group, and the dialkylamino group such as the dimethylamino group and the diethylamino group.

A preferred embodiment of the NLO compound according to the invention, is characterized in that the $\pi$-conjugated system has a structure as shown in formula 4

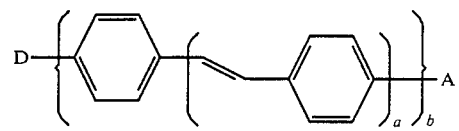

wherein a has a value of 0, 1 or 2, b has a value of 1 or 2, and wherein A is an electron-acceptor group and D is an electron donor group. Representatives of these $\pi$-conjugated systems are, for example, the phenylene group (a=0, b=1); the biphenylene group (a=0, b=2); the stilbene group (a=1, b=1) and the group wherein a=2 and b=1. Elongation of the conjugation leads to an increase of the value of $\beta$, however, this causes the absorption band to be shifted to longer wavelengths and, in addition, the solubility in polymers to decrease. Such compounds can be bonded to polymer chains of a matrix in a covalent manner by providing the electron-donor groups and/or electron-acceptor groups with reactive substituents. An advantage of the use of the sulphone group as an acceptor relative to the nitro group is the possibility of radical-polymerisation. In the case of compounds having a nitrogroup as the acceptor and a donor which is substituted with a (meth)acrylate, the chain length remains short in the case of polymerization, whereas in the case of corresponding compounds having a sulphone group as the acceptor a long chain is formed.

By providing both the electron-acceptor group and the electron-donor group with reactive substituents such NLO compounds can be copolymerised with, for example, (meth)acrylate monomers, the NLO compounds being incorporated in a covalent manner in polymer networks of, for example, a di(meth)acrylate matrix.

It will be clear to those skilled in the art that alkyl groups in the above-mentioned substituents can be substituted individually at will with, for example aryl groups or cycloalkyl groups. The choice of the electron donor and the length of the $\pi$-conjugated sytem determine the location of the absorption maximum and also the minimum wavelength of the light to be doubled in frequency. Relative to the known electron acceptors, the sulphone group has the advantage of a narrow absorption band.

A further object of the invention is, inter alia, to provide a NLO medium in which the minimum wavelength which can be doubled in frequency is reduced, and another object of the invention is, inter alia, to provide a NLO medium which is suitable for doubling the frequency of (laser) light having a wavelength of approximately 800 nm, while forming blue light having a wavelength of approximately 400 nm. According to this invention, this object is achieved by a medium as described in the opening paragraph, which is characterized in that the electron-acceptor group is a sulphone group. The NLO medium serves to convert the incident fundamental light wave having a frequency $\omega$ to a second harmonic wave having a frequency $2\omega$. An advantage of the NLO medium according to the invention is the transparency to light having a wavelength of approximately 400 nm, so that this medium is suitable for doubling the frequency of light having a wavelength of approximately 800 nm, as emitted by a GaAs laser. The medium according to the invention is not (liquid) crystalline but amorphous, so that light scattering is minimal. The substituent $R_1$ of the sulphone group, such a an alkyl group or an alkoxy group makes it possible to influence the solubility of the NLO compounds in the polymer matrix. A solution of NLO compounds in a polymer matrix such as PMMA, can be prepared by dissolving NLO compounds in the molten polymer or by dissolving the polymer in a suitable solvent and dissolving the NLO compounds in the solution obtained. A polymer in which NLO compounds are dissolved is obtained by evaporating the solvent of the latter solution.

The polar order of the NLO compounds is obtained by poling in an electric field at a temperature above the glass transition temperature of the polymer matrix, after which the order is frozen-in by cooling. This method is described in the above-mentioned article by D. J. Williams. Poling by means of a corona-discharge is also possible, as described by R. B. Comizzoli in J. Electrochem. Soc. Vol. 134 (1987) 424–429.

In European Patent Application EP 254921 mentioned in the opening paragraph, a crystal of MNA is used as the NLO medium. Such organic crystals have a number of disadvantages such as a low melting point, a high vapour pressure and brittleness. Moreover, these crystals are difficult to grow and hard to work up into waveguides in the form of thin films or fibres. Polymers can be worked up into, for example, thin films in a simple manner, by providing a polymer solution on a substrate by means of spin coating or dip coating, after which the solvent used is evaporated and the polymer film remains.

In European Patent Application EP 262680, a NLO medium is described which is manufactured by heating a liquid crystalline polymer to an isotropic phase, after which the polymer is quickly cooled. The medium this obtained is isotropic and can only be used for third-order nonlinear optical response due to the lack of a polar order of the NLO compounds. Frequency-doubling (second order NLO effect) cannot be obtained with such a medium. The NLO compounds and NLO media according to the invention are not liquid crystalline.

An embodiment of the NLO medium according to the invention is characterized in that the NLO compounds are bonded to the polymer matrix in a covalent manner. The advantage hereof is the above-described possible increase in concentration of the NLO molecules in the polymer matrix relative to a solution of NLO molecules in a polymer matrix. Also when NLO molecules are bonded to a polymer matrix in a covalent manner, poling is possible under the influence of an electric field if the polymer matrix is heated to a temperature above the glass transition temperature and the composition is frozen-in by cooling after it has been ordered. Moreover, it has been found that with such NLO molecules which are bonded in a covalent manner the decrease of the NLO effect as a function of time is much smaller than with solution of NLO molecules in a polymer matrix. It is alternatively possible to provide both ends of the NLO molecules, i.e. both the electron-donor side and the sulphone-group side, with reactive groups such as (meth)acrylate groups, thereby enabling the NLO molecules to be incorporated in polymer networks via covalent bonds.

An embodiment of the NLO medium according to the invention is characterized in that the polymer matrix is polymethyl-methacrylate. PMMA has the advantage that, inter alia, transparent at least in the wavelength range from 400–800 nm, so that it can be suitably used a blue light producing laser. Moreover, PMMA can be readily worked up into films by dissolving it in, for example, chlorobenzene and subsequently spin coating it onto a substrate. Other suitable polymer matrix materials are, for example, polystyrene and polysiloxane.

A further object of the invention is to provide a method of manufacturing a NLO medium which can be suitably used to double the frequency of red (laser) light having a wavelength of approximately 800 nm while forming blue (laser) light having a wavelength of approximately 400 nm.

According to the invention, this object is achieved by a method which is characterized in that a solid solution of NLO compounds which comprise a sulphone group as the electron-acceptor group in PMMA is heated to a temperature above the glass transition temperature of the solid solution, after which it is poled under the influence of a dc-electric field and the solution is cooled to a temperature below the glass transition temperature. The poling of polymers is described in the above-mentioned article by D. J. Williams. The above-mentioned corona discharge which enables a higher field strength and, hence, a better order of the NLO compounds to be attained may alternatively be used. The said method also circumvents the above-described disadvantages of the use of organic crystals.

An embodiment of the method according to the invention for the manufacture of a NLO medium is characterized in that NLO compounds which comprise a sulphone group with a (meth)acrylate group as the substituent are polymerised either with or without (meth)acrylate monomers, after which the polymer obtained is poled at a temperature above the glass transition temperature under the influence of a dc electric field, after which it is cooled to a temperature below its glass transition temperature. By means of said method, a NLO medium is obtained in which the NLO compounds are bonded to the chains of the polymer matrix in a covalent manner. Such a medium has, inter alia, the above-mentioned advantage viz. the possibility of a higher concentration of NLO compounds. Copolymers of such reactive NLO compounds and (meth)acrylate monomers are to be preferred to homopolymers, because homopolymers crystallise out readily and bring about a disadvantageous light scattering. Dependent upon the mixing ratio of the reactive NLO compounds and the (meth)acrylate monomers, a copolymer can be obtained as the NLO medium having between 0 and 100 mol. % of NLO compounds which are bonded in a covalent manner.

The invention also relates to a device for doubling the frequency of a light wave, in which a fundamental light wave is passed through a NLO medium, so as to form a second harmonic wave, and is characterized in that a medium as described hereinbefore is used as the NLO medium. As described above, the use of such a device in combination with a NLO medium according to the invention, enables red (laser) light having a wavelength of approximately 800 nm to be converted into blue (laser) light having a wavelength of approximately 400 nm. This can be attributed to the fact that, in contrast to, for example, corresponding nitro compounds and cyano compounds the NLO sulphone compounds described hereinbefore exhibit little absorption of both red and blue light.

Besides their use in the said device for doubling the frequency of light, the above-mentioned compounds and media according to the invention can also be suitably used of course for electrooptical switches which are based on the Pockels effect.

DETAILED DESCRIPTION OF THE INVENTION

Figure 1:
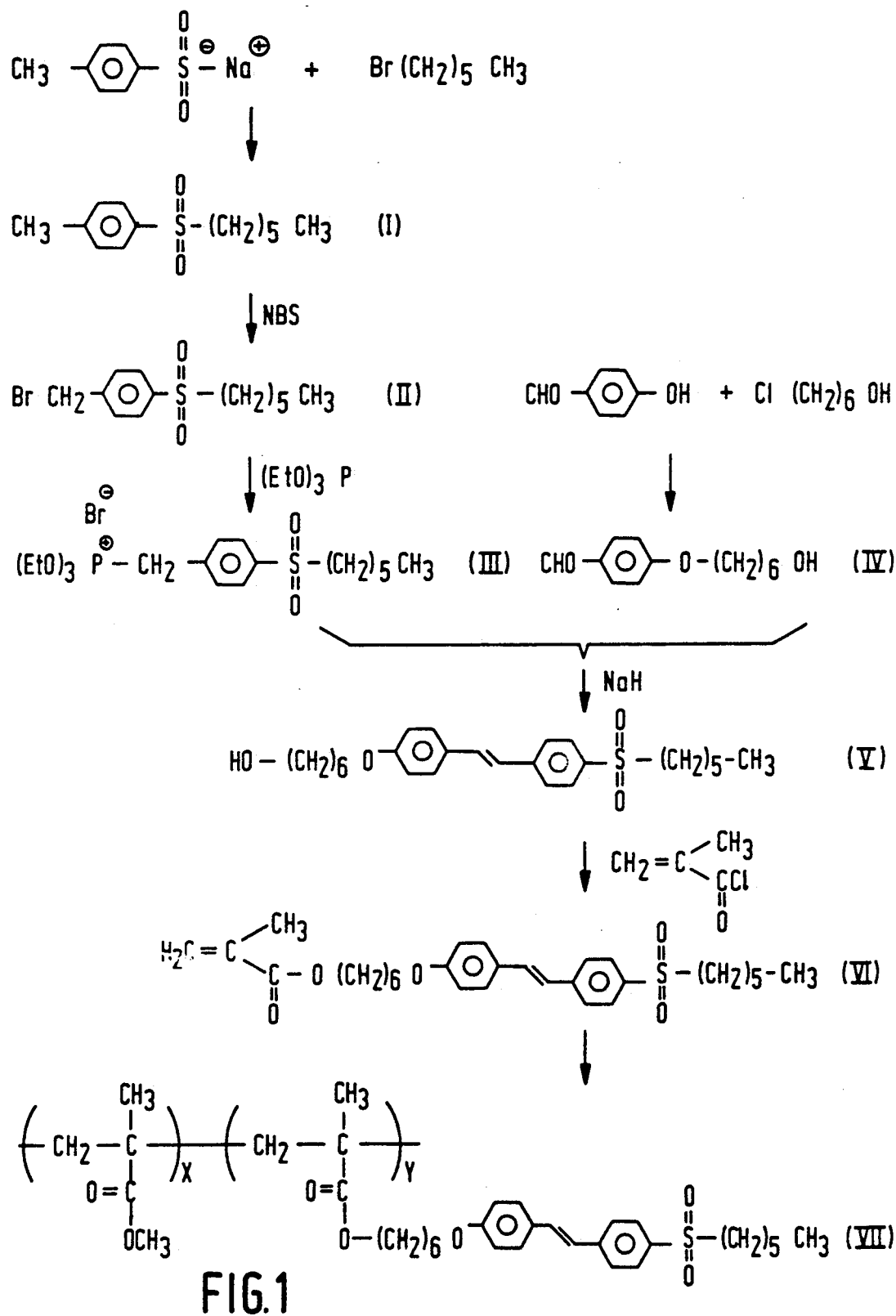
FIG. 1 is a reaction diagram for the preparation of NLO compounds according to the invention.

The invention will now be described in greater detail with reference to the figures of the drawing and the following exemplary embodiments.

EXEMPLARY EMBODIMENT 1

The synthesis of copolymers of type VII (FIG. 1) is shown as an example of NLO polymers based on the sulphone group as the electron acceptor. The fractions of x and y can be chosen at will and vary between 0 and 1, with $x+y=1$. The preparation of such a copolymer is diagrammatically shown in FIG. 1.

a. Preparation of substance I

A mixture of 100 g of sodium-p-toluenesulphinate (0.56 mol), 120 g of n-hexylbromide (0.73 mol), 6 g of NaI and 300 ml of methanol are refluxed for 20 hours. After cooling, 300 ml of water is added and the product is extracted with 2×250 ml of toluene. The organic layer is washed with 250 ml of water, after which it is dried and evaporated. The residue is heated in a "Kugelrohr" device (100° C.; 1 mbar) in order to remove the n-hexylbromide. The yield is 99.1 g of substance I (0.413 mol).

By reacting hydroxy-alkyl bromide instead of n-hexylbromide with the toluene sulphinate, not the alkylsulphone group but the corresponding hydroxy-alkylsulphone group is formed from which the alkyl(meth)acrylate-sulphone group is prepared.

b. Preparation of substance II 99 g of substance I are refluxed with 93 g of NBS (N-bromosuccinimide) and 100 ml of $CCl_4$ for 11 hours, with occasional addition of a small quantity of dibenzoyl peroxide. $CHCl_3$ is added to the cooled reaction mixture, after which the mixture is washed twice with water. After the $CHCl_3$ has dried and evaporated a crude substance II remains.

c. Preparation of substance III

The crude substance II is heated to 110° C. together with some triethyl phosphite. More triethyl phosphite (overall quantity 45 g, 0.27 mol) is added in 10 minutes at a temperature of 105°–115° C. Subsequently, the mixture is heated for half an hour at the same temperature. After it has cooled, a part (approximately 70%) of this crude reaction mixtures is distributed to a $Al_2O_3$ chromatrographic column using toluene/hexane, toluene and chloroform as an eluent. In order of elution appear, in succession, a small quantity of the starting product I, 45 g of a 1:1 mixture of substance I and the desired phosphonate III and 15 g of the pure phosphonate III.

d. Preparation of substance V (Wittig reaction)

The above-obtained intermediate fraction of 45 g is mixed with 18 g of aldehyde IV (see below) and 150 ml of DMF (dimethyl formamide). The solution is cooled by means of a cold water bath, after which 2 g of NaH dispersion is added. After stirring for 20 minutes, 1.8 g of NaH dispersion is again added (overall quantity 48.1 mmol). After stirring for 3 hours, 250 ml of water is added and some ethanol. The product V is obtained by filtration and washed with a mixture of water and ethanol. After drying the crude product is recrystallised from toluene, thereby forming 17.3 g of colourless product (39 mmol). $^1$H-NMR-spectroscopy ($CDCl_3$) gives the following results: 0.7–2.0 (m, 19 H), 2.8–3.2 (m, 3 H), 3.6 (t, 2 H) 4.0 (t, 2 H), 6.7–7.9 (m, 10 H).

e. Preparation of substance IV

A mixture of 100 g of p-hydroxybenzaldehyde (0.82 mol), 16 g of NaI, 300 ml of ethanol (96%) and 54 g of KOH/80 ml of water is heated until a clear solution is obtained. Subsequently, 112 g of 6-chloro-1-hexanol (0.82 mol) are added, after which the mixture is refluxed for 24 hours. After cooling, water is added and the product IV is extracted twice with $CHCl_3$. After washing with water, drying and evaporating, the crude aldehyde IV is formed which is used as such in the above-mentioned reaction. $^1$H-NMR-spectroscopy ($CDCl_3$) gives the following results: δ1.2–2.0 (m, 8H), 3.0 (s, 1 H), 3.4–3.8 (m, 2 H), 4.0 (t, 2 H), 6.8–7.9 (dd, J=8.4 H), 9.8 (s, 1 H).

f. Preparation of substance VI 2.8 g of N,N-dimethylaniline are added to a mixture of 8.26 g of substance V (0.019 mol) in dry $CH_2Cl_2$. After cooling to 0° C., 24 g of methacryloylchloride in 25 ml of dry $CH_2Cl_2$ are added dropwise. The reaction mixture is stirred for 3 days at room temperature, after which 500 ml of ice water are added. The product VI is extracted with $CH_2Cl_2$ and the organic layers are washed with in succession water (3x); 0.1 N $H_2SO_4$ (3x); water (3x) and subsequently dried over $MgSO_4$ and evaporated, yielding 7.4 g of the crude substance VI. Column chromatography over $Al_2O_3$ (activity II/III) with $CH_2Cl_2$ yields 2.75 g of pure solid white substance VI. $^1$H-NMR spectroscopy ($CDCl_3$) gives the following results: δ0.9 (t, 3 H), 1.05–1.95 (m, 16 H), 1.95 (q, 3 H), 3.05 (t, 2 H), 4.0 (t, 2 H), 4.15 (t, 2 H), 5.5 (m, 1 H), 6.1 (m, 1 H), 6.7–7.8 (m, 10 H).

The products V and VI are useful NLO compounds and can be dissolved in, for example, a polymer matrix. Product VI can additionally be (co)polymerised into a NLO polymer.

g. Preparation of polymer VII (x=0, y=1)

A solution of 500 mg of product VI and 15 mg of benzoyl peroxide in 10 ml of dry toluene is degaswed by means of the freeze-thaw method. The degassed solution is stirred for 3 days at 95° C., after which methanol is added to the cooled reaction mixture. The polymer VII precipitates from the solution and is filtered off, after which it is thoroughly washed with methanol. The yield is 245 mg of pure polymer VII. The melting point is 80° C. The weight average molecular weight ($\bar{M}_w$) is determined by means of gel permeation chromatography relative to PMMA standards and is $1.5 \cdot 10^4$. NMR spectroscopy ($^1$H(CDCl$_3$) gives the following results: δ 0.9 (t, 3 H), 1.05-2.1 (m, 21 H), 3.05 (t, 2 H), 3.9 (m, 4 H), 6.6-7.8 (m, 10 H).

A copolymer VII, with x≠0 and y≠1 is prepared in an analogous manner by additionally adding methyl methacrylate to the reaction mixture.

EXEMPLARY EMBODIMENT 2

Figure 2:
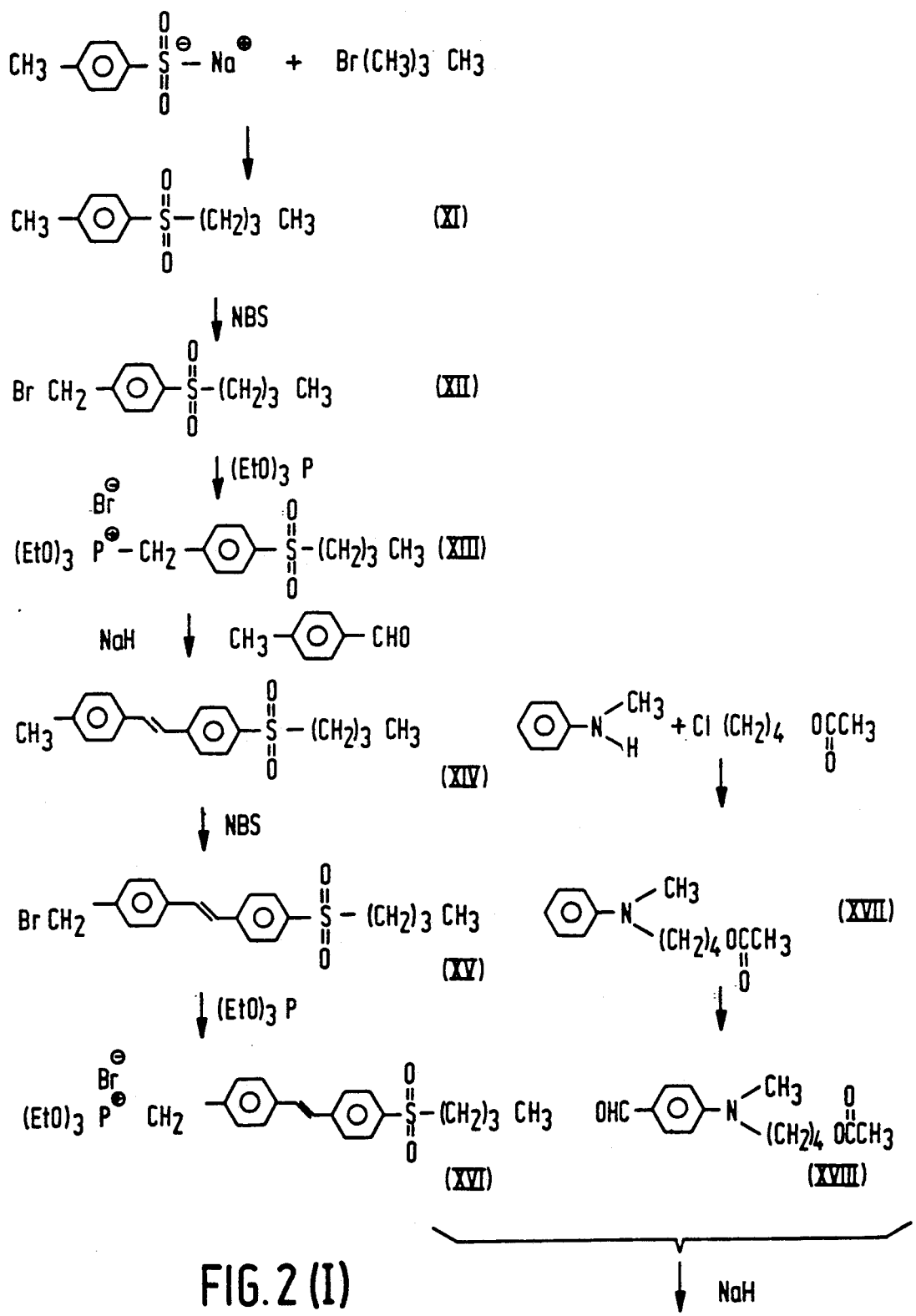
FIG. 2 is another reaction diagram for the preparation of NLO compounds according to the invention.

The synthesis of the polymer of type XXII, the preparation of which is diagrammatically shown in FIG. 2, is shown as an example of NLO polymers based on the sulphone group as an electron acceptor, the amino group as an electron donor and an extensive π-conjugated system. The wavelength at which the absorption is maximal is ($\lambda_{max}$) 410 nm and the wavelength above which there is no appreciable absorption ($\lambda_{cut-off}$) is 500 nm. In contrast to corresponding known NLO polymers comprising a nitro group or cyano group as the electron acceptor, the doubling of the frequency of laser light from 1064 nm to 532 nm can be readily attained by means of the NLO polymers in question.

Preparation of substance XI

A mixture of 310 g of sodium-p-toluene sulphinate (1.74 mol), 310 g of n-butylbromide (2.26 mol), 8 g of NaI and 550 of ethanol are refluxed for 18 hours. After cooling, water is added and the product is extracted twice with toluene. After washing with water, drying and evaporating 334 g (1.75 mol) of the crude substance XI is formed, which is used as such in the next step.

b. Preparation of substance XIV

A mixture of said crude sulphone XI, 300 ml of CCl$_4$ and 300 g of NBS (1.685 mol) is refluxed for 8 hours, from time to time a small quantity of dibenzoyl peroxide being added. When this operation is completed, 50% of product XII is present (established by means of $^1$H NMR). After cooling, some toluene is added, after which the mixture is washed twice with water and subsequently dried and evaporated. 30 g of triethylphosphite is added to the residue after which the mixture is heated to 110°-120° C. Subsequently, 120 g of triethylphosphite (overall quantity 0.90 mol) is added in portions at a temperature of 110°-120° C., after which the mixture is heated at 115°-125° C. for 30 minutes. In this manner, crude product XIII is obtained. After cooling, 110 g of p-tolualdehyde (0.92 mol) and 300 ml of DMF are added. The mixture is cooled by means of ice water, after which 30 g of NaH dispersion (55-60% in oil, 0.69 mol) are added in portions of 5 g for 1 hour. After stirring for 1 hour at a temperature below 20° C., water is slowly added and subsequently ethanol is added, so that a precipitate is formed. Said precipitate is filtered off and washed with ethanol. 55 g of stilbene XIV (0.175 mol) are formed. $^1$H NMR spectroscopy (CDCl$_3$) gives the following results: δ 0.7-2.0 (m, 7 H), 2.3 (s, 3 H), 3.1 (t, 2 H), 7.0-7.9 (m, 10 H).

c. Preparation of substance XX

A mixture of 55 g of stilbene XIV (0.175 mol), 100 ml of CCl$_4$, 50 ml of tetrachloroethane and 53 g of NBS (0.30 mol) are refluxed for 3 hours, now and then small quantities of dibenzoyl peroxide being added. NMR spectroscopy shows that the CH$_3$ signal has largely disappeared. After cooling, the residue is diluted with chloroform and, subsequently, washed twice with water. After drying and evaporating, diethylether is added to the residue after which the precipitated product is isolated by filtration. In this manner, 39.8 g of the desired bromide XV (0.101 mol) are obtained. NMR spectroscopy gives the following results: δ 0.7-1.9 (m, 7 H), 3.1 (t, 2 H), 4.5 (s, 2 H), 7.1-7.9 (m, 10 H).

Said bromide XV is heated for half an hour together with 50 ml of toluene and 25 ml of triethylphosphate at approximately 110° C. Subsequently, the mixture is evaporated after which ether is added to the residue. The solid substance is obtained by filtration and amounts to 37 g of phosphonate XVI (0.082 mol). A mixture of said phosphonate XVI, 130 ml of DMF and 27.5 g of aldehyde XVIII (see below) is cooled by means of a water bath. NaH dispersion (4.6 g; 0.105 mol) is added in two equal portions at intervals of half an hour. In this manner, product XIX is formed. After stirring for 6 hours, a solution of 20 g of KOH in 150 ml of methanol is added and the mixture is stored for one night. The precipitate is filtered off, washed with methanol and subsequently dried at 100° C. under vacuum. The crude product is recrystallised from a mixture of approximately 150 ml of xylene and approximately 100 ml of DMF. In this manner, 20.7 g of the orange product XX are obtained. A further 6.4 g of pure product XX are obtained from the filtrate. The overall yield is 27.1 g (53.9 mmol). $^1$H-NMR (CDCl$_3$-DMSO-d6) gives the following results: δ 0.7-1.0 (t, 3 H), 1.1-1.9 (m, 8 H), 2.8-3.5 (m) and 2.9 (s)(10 H), 6.1-7.5 (m, 16 H).

d. Preparation of substance XVIII

A mixture of 250 g of N-methylaniline (2.34 mol) and 300 g of 4-chlorobutylacetate (1.99 mol) is heated to 100°-105° C. for 18 hours. After cooling, toluene and water are added to the mixture. Subsequently, NaHCO$_3$ is slowly added, the layers are separated and the organic layer is washed with water. Subsequently, the mixture is dried and evaporated. The residue is heated in a Kugelrohr device at 120° C. (15 mbar) in order to remove unreacted starting materials. The residue XVII is dissolved in 100 ml of DMF and this solution is added to a mixture of 100 ml of POCl$_3$ and 250 ml of DMF in one hour, the temperature of the reaction mixture rising to approximately 80° C. After heating to 70°-85° C. for two hours, the mixture is poured onto a water/chloroform mixture. A solution of 380 g of NaOH in water is added in portions while stirring vigorously, the mixture being cooled in this process. The layers are separated, the aqueous layer is extracted by means of chloroform and the organic layers are washed with water, after which they are dried and evaporated. After destillation by means of a Kugelrohr device at 200° C. (0.5 mbar), 224 g (0.90 mol) of aldehyde XVIII are obtained.

$^1$H NMR spectroscopy (CdCl$_3$) gives the following results: δ 1.4-1.7 (m, 4 H), 1.9 (s, 3 H), 3.1-3.6 (m, 2 H), 3.8-4.1 (t, 2 H), 6.4-7.6 (dd, J=8.4 H), 9.5 (s, 1 H).

e. Preparation of substance XXI 1.08 g (12 mmol) of acryloyl chloride in 10 ml of dry $CH_2Cl_2$ are added dropwise to a cooled solution of 4.6 g (10 mmol) of substance XX, 1.52 g (12 mmol) of N,N-dimethylaniline and 500 ml of dry $CH_2Cl_2$. The reaction mixture is stirred under a nitrogen atmosphere at room temperature for 5 days, after which 300 ml of water was added. The product is extracted with $CH_2Cl_2$ and the organic layers are washed with water (3x); 0.1 N $H_2SO_4$ (3x); 2% of $NaHCO_3$ (3x) and water (3x) after which it is dried over $MgSO_4$ and evaporated at room temperature. Pure acrylate XXI is obtained after crystallisation from toluene. The yield is 2.21 g. The melting point is 275° C. $^1$H-NMR spectroscopy ($CDCl_3$) gives the following results: δ 0.95 (t, 3 H), 0.9-1.85 (m, 8 H), 2.95 (s, 3 H), 3.05 (t, 2 H), 3.4 (t, 3 H), 4.2 (t, 2 H), 5.6-6.7 (m, 3 H), 6.7-8.0 (m, 16 H).

The products XX and XXI obtained are useful NLO compounds and can be dissolved, for example, in a polymer matrix. Product XXI can be polymerised additionally to form an NLO polymer.

f. Preparation of polymer XXII 500 mg of acrylate XXI are dissolved in 15 ml of warm dry toluene. After cooling, 15 mg of dibenzoylperoxide are added and the reaction mixture is degassed by means of the freeze-thaw method. Polymerisation takes place at 95° C. for 3 days. After cooling, methanol is added and the polymer is collected by filtration. After washing thoroughly with methanol and drying in vacuum, 320 mg of polymer XXII are obtained.

EXEMPLARY EMBODIMENT 3

The hyperpolarisability β of the NLO compounds obtained is determined by means of the EFISH (electric-field-induced second-harmonic generation) method. Said method is described in the above-mentioned article by D. J. Williams. The β-measurements are carried out by means of a Nd:YAG laser having a wavelength of 1.9 μm, the NLO compounds being dissolved in, for example, dioxan. To measure the second-order nonlinear optical susceptibility $\chi^{(2)}$, the same measuring arrangement is used, but the measuring operation is carried out at a laser wavelength of 1.064 μm (Nd:YAG laser). A quartz crystal is used as the reference for the measurements. To determine the $\chi^{(2)}$ of the polymers, said polymers are dissolved in $CHCl_3$, after which the solution is spin coated onto a quartz substrate which is provided with a ITO (indium-tinoxide) electrode. The thickness of the film layer is approximately 1 μm. The layer is poled by means of the above-mentioned corona-poling method. Measuring $\chi^{(2)}$ takes place during the poling process. The determination $\chi^{(2)}$ of the NLO compounds dissolved in PMMA is carried out in the same manner. The dipole moment $\mu_o$ of the molecules is determined in a standard manner by measuring the dielectric constant of the solutions of the NLO compounds in dioxan. In the relevant literature the value of β is expressed in esu units, with 1 esu=4.1888·$10^{10}$$m^4$/V. The value of $\chi^{(2)}$ is expressed in pm/V, with 1 pm/V=2.387·$10^{-9}$ esu.

The result of the measurements are given hereinbelow.

A. Homopolymer VII (x=0, y=1)

For the homopolymer VII (x=0, y=1) the value of $\chi^{(2)}$=6.6 pm/V. The wavelength at which the absorption is maximal ($\lambda_{max}$) is 335 nm. The wavelength above which there is no appreciable absorption any more ($\lambda_{cut-off}$) is 410 nm. The refractive index at 650 nm is 1.585 and at 480 nm the refractive index is 1.620. Consequently, the polymer obtained is suitable for doubling the frequency of red laser light, the wavelength of the blue light formed is approximately 400 nm.

B. NLO compounds dissolved in PMMA

| NLO-compound | conc. (wt. %) | $^{(2)}$ (pm/V) |
|---|---|---|
| DANS | 2% | 4,2 |
| XX | 1% | 2,0 |
| V | 5% | 0,4 |

The DANS compound is the above-mentioned NLO compound 4-dimethylamino-4'-nitrostilbene and serves as a comparative example. The compounds XX (FIG. 2) and V (FIG. 1) are compounds according to the invention.

The NLO effect of these compounds is less than that of DANS, but the latter compound is not suitable for doubling the frequency of red (laser) light, because $\lambda_{max}$ and $\lambda_{cut-off}$ of DANS are 424 nm and 580 nm, respectively. In contrast, $\lambda_{max}$ and $\lambda_{cut-off}$ of compound V are 335 nm and 405 nm, respectively.

C. NLO compounds dissolved in dioxan

| NLO-compound | β (esu) | $\mu_o$ (D) |
|---|---|---|
| DANS | 106 · $10^{-30}$ | 7.2 |
| XX | 200 · $10^{-30}$ | — |
| V | 10 · $10^{-30}$ | 6.5 |

DANS is again used as a comparative example. This compound has a higher value of β than compound V according to the invention, however, as noted under B, DANS is unsuitable for doubling the frequency of red laser light. The value of β for compound V at a wavelength of 810 nm is considerably higher at a value of 45 $10^{-30}$ esu.

EXEMPLARY EMBODIMENT 4

Figure 3:
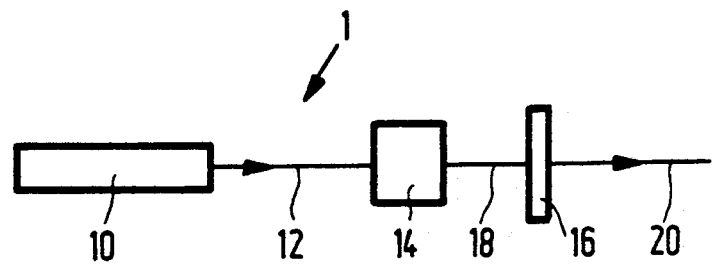
FIG. 3 is a diagrammatic representation of a device according to the invention.

FIG. 3 diagrammatically shows a device 1 for doubling the frequency of red laser light. Reference numeral 10 denotes a GaAs laser light source by means of which laser light beam 12 having a wavelength of 820 nm is generated. The laser light 12 is incident on a NLO medium 14 according to the invention, in which medium a second harmonic light wave having a wavelength of 410 nm (blue) is generated. The beam 18 emanating from the NLO medium comprises both light having a wavelength of 820 nm and light having a wavelength of 410 nm. A filter 16 is a low-pass filter which obstructs the red light, so that beam 20 only contains blue light.

EXEMPLARY EMBODIMENT 5

Figure 4:
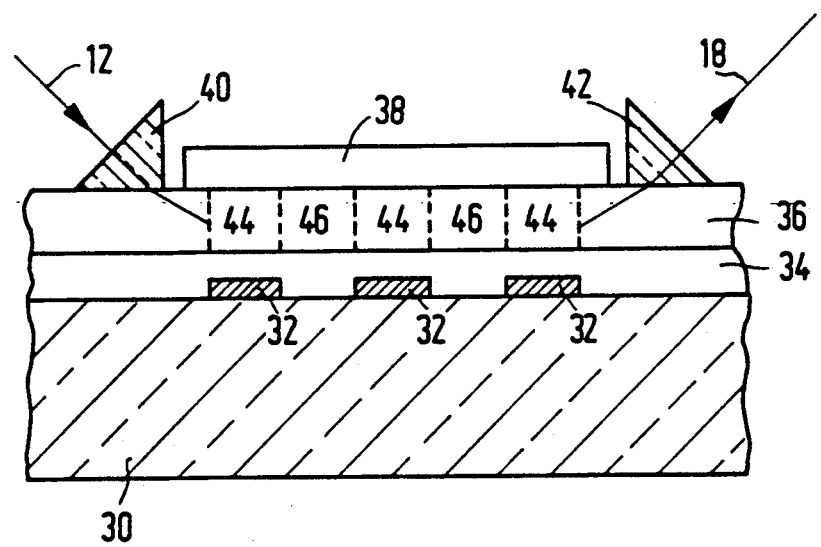
FIG. 4 is a cross-sectional view of a device according to the invention.

FIG. 4 is a diagrammatic cross-sectional view of an embodiment of a device for doubling the frequency of a light wave. A glass substrate 30 is provided with strip-shaped ITO electrodes 32 which are all grounded. Said electrodes have a width of approximately 10 μm and the interspace between them is also approximately 10 μm. A buffer layer 34 of PMMA having a thickness of 1 μm is applied to the ITO electrodes and the glass substrate by means of spin coating a 10% by weight solution of PMMA in chlorobenzene. A layer 36 having a thickness of 2 μm is applied to said PMMA layer by means of spin coating a 5% by weight solution of NLO polymer VII (x=0.5, y=0.5), in chlorobenzene. In the same manner, a second buffer layer 38 of PMMA having a thickness of 1 μm is applied to said NLO layer 36. To prevent dissolution of the already applied polymer layers by a spin coating solution, said polymer layers can be provided with a thin barrier layer, for example, of polysiloxane. A coupling-in prism 40 and a coupling-out prism 42 are provided on the NLO layer 36. Apart from the inventive NLO polymer used, the above-described construction of the device is known from an article by A. Buckley et al. in Nato Advanced Research Workshop "Non-linear optical effects in organic polymers", Sophia Antipolis, France, June 1988. By means of the strip-shaped ITO electrodes 32 the NLO polymer layer 36 can be poled in accordance with a pattern to form poled areas 44. The molecules in the areas 44 of the NLO layer 36 are poled by heating the composition shown to approximately 127° C. and, subsequently, subjecting it to a corona discharge. The order of the NLO molecules is frozen-in during cooling, while maintaining the corona discharge. After said operation has been completed, poled areas 44 and unpoled areas 46 are formed in the NLO layer 36. This patterned poling is necessary for the NLO layer to meet the "phase matching" requirement, and is explained further in the above-mentioned article by A. Buckley et al. A beam of laser light 12 having a wavelength of 820 nm which emanates from a GaAs laser (not shown) enters into the NLO layer 36 via the coupling-in prism 40. Blue light is generated in the first poled area 44 through which the beam passes, and in the following unpoled area 46 "phase-matching" without second harmonic generation takes place. This process takes place a number of times after which the beam emerges via the coupling-out prism 42. The emerging beam 18 contains blue light having a wavelength of 410 nm.

EXEMPLARY EMBODIMENT 6

Figure 5:
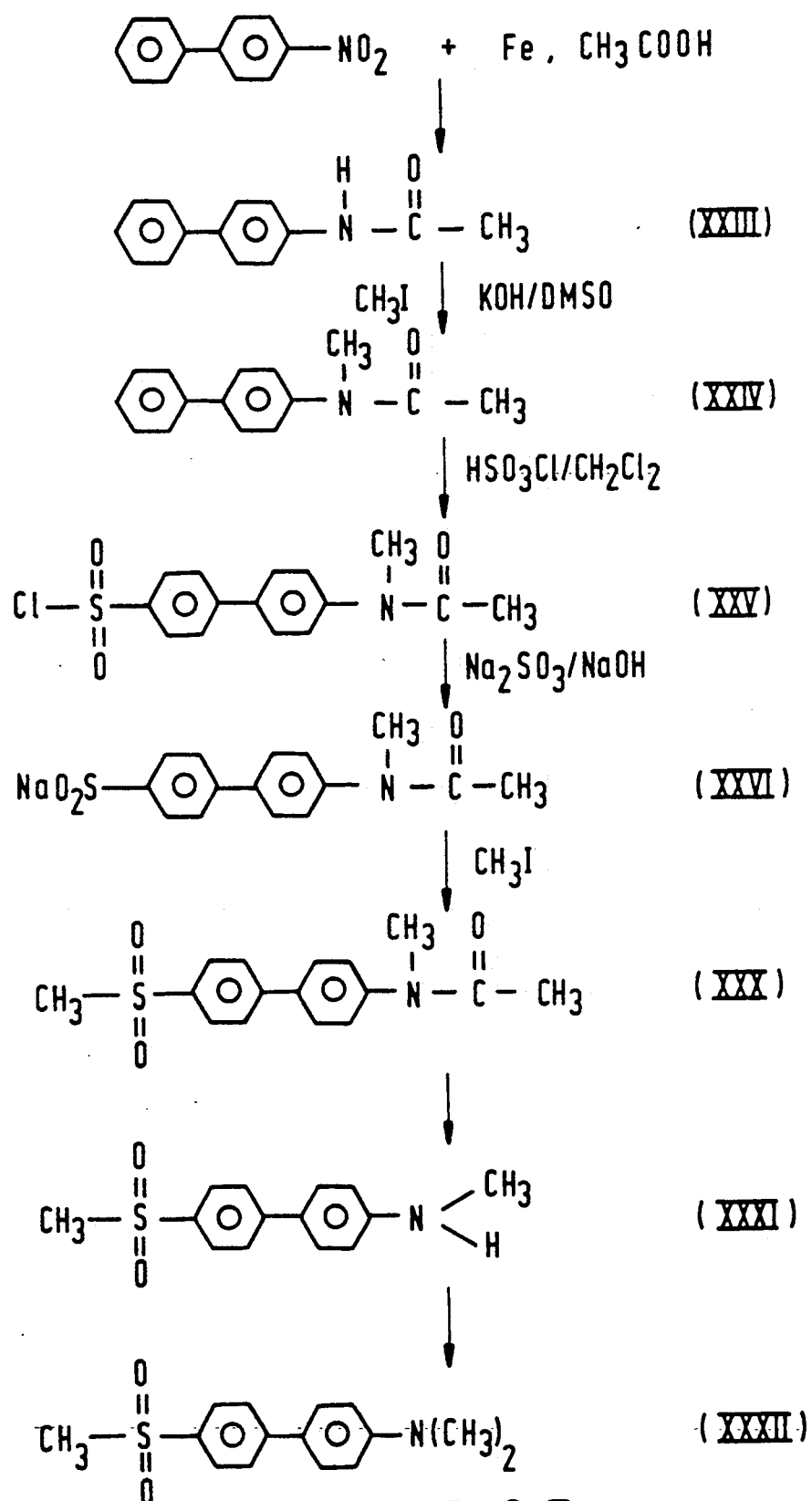
FIG. 5 is a reaction diagram for the preparation of NLO compounds according to the invention.

Compound XXXII has values of $\beta$ of $10 \cdot 10^{-30}$ esu at 1907 nm, $35 \cdot 10^{-30}$ esu at 1064 nm, and of $105.19 \cdot 10^{-30}$ esu at 810 nm. $\lambda_{max}$ and $\lambda_{cut-off}$ are 340 nm and 410 nm, respectively. The synthesis of compound XXXII is shown in FIG. 5.

a. Preparation of substance XXIII

A mixture of 100 g of 4-nitrobifenyl (0.5 mol), 1300 ml of acetic acid and 130 g of iron are refluxed for 20 hours. After cooling, the mixture is filtered and poured into 3 l of ice/water. The product is extracted with $2 \times 500$ ml of $CHCl_3$. The organic layer is washed twice with 250 ml of water, after which it is dried and evaporated. The resulting solid product is recrystallised from 96% ethanol. The yield is 89 g of substance XXIII (85%).

b. Preparation of substance XXIV 56.25 g of substance XXIV is dissolved in 150 ml DMSO, to which 20 g of powdered KOH is added. The mixture is cooled in ice. Over a period of 20 minutes, 50 of $CH_3I$ is added slowly, so that the temperature stays below 30° C. The mixture is stirred for 5 hours at room temperature and then poured into water. The residue is filtered and washed with water. After recrystallisation from a 1:1 mixture of 96% ethanol and water, 46 g of crystals of substance XXIV are isolated (yield 82%).

Preparation of substance XXV 100 g of chlorosulfonic acid is slowly added to a solution of 23 g of substance XXIV (0.1 mol) in 200 ml of $CH_2Cl_2$, the mixture being cooled in ice/water. The mixture is stirred for 2 hours at room temperature and then poured in ice. The product is extracted with $2 \times 150$ ml of $CHCl_3$. The $CHCl_3$ layer is washed twice with water (150 ml) and dried. After evaporation 16.8 g of compound XXV is obtained as a slowly solidifying oil.

d. Preparation of substance XXVI 16.8 g of powdered substance XXV (0.052 mol) is added to a solution of 25 g of $Na_2SO_3$ in 500 ml of water. A 50% solution of NaOH in water is added to maintain a pH higher than 7. The mixture is stirred for 20 hours at room temperature and then acidified with sulfuric acid. The residue is filtered and neutralised with a solution of $Na_2CO_3$ in water. The solution is extracted with $CHCl_3$. The water layer is evaporated, yielding 12.4 g of solid substance XXVI (0.041 mol).

e. Preparation of substance XXX

To a solution of 4 g of substance XXVI in 90 ml methanol and 10 ml water, 5 ml of $CH_3I$ is added. After refluxing for 8 hours, 150 ml of water is added. The turbid liquid is extracted with $CHCl_3$, which is then dried and evaporated. The yield is 2.3 g of solid substance XXX.

f. Preparation of substance XXXI 2.0 g of substance XXX is refluxed for 48 hours with 50 ml of concentrated HCl and 25 ml of water. The residue that results after cooling is filtered and stirred with NaOH in water and toluene. Filtration of the reaction mixture results in a crude product XXXI.

g. Preparation of substance XXXII

The crude product XXXI is refluxed for 24 hours in 25 ml of aceton with 2 ml of $CH_2I$. After concentration of the mixture by evaporation, it is stirred with a 10% solution of NaOH in $CHCl_3$. The $CHCl_3$ layer is separated and dried. After evaporation the crude product XXXII is obtained, which is recrystallised from ethanol.

EXEMPLARY EMBODIMENT 7

Figure 6:
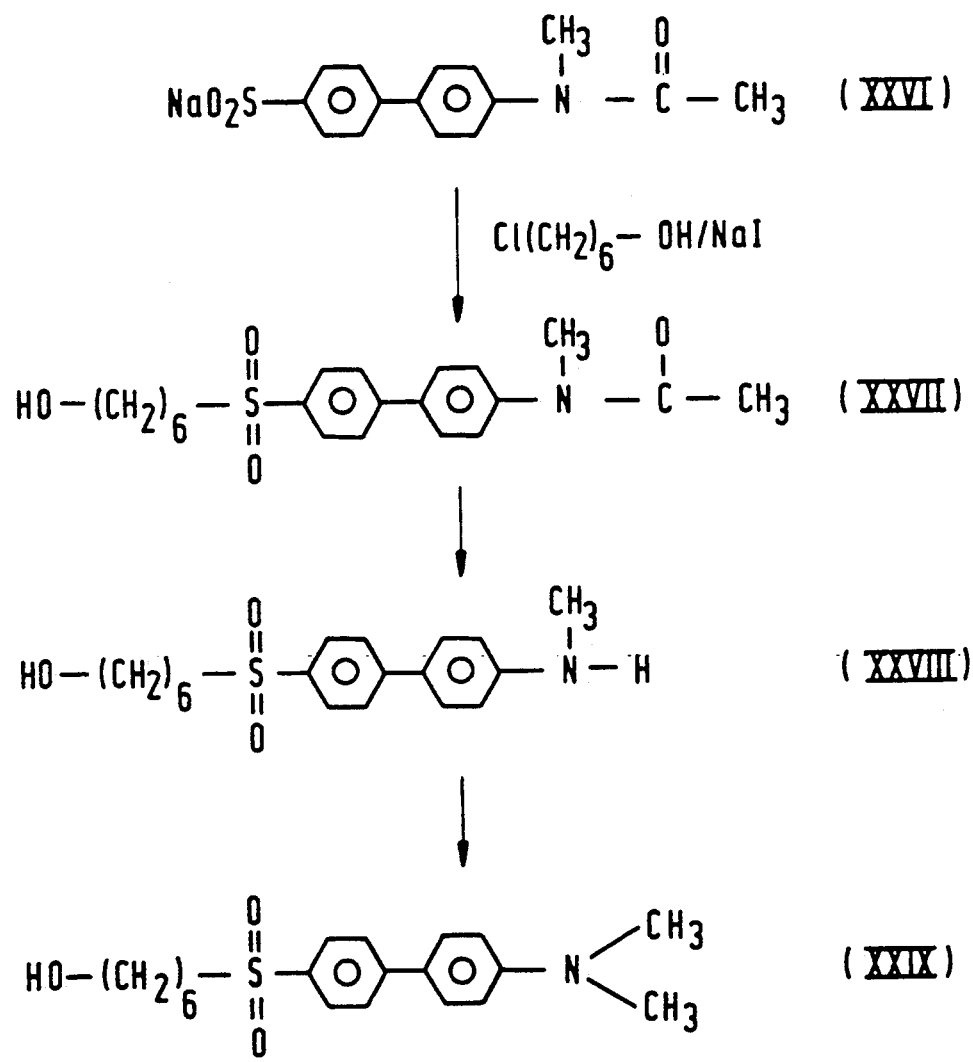
FIG. 6 is another reaction diagram for the preparation of NLO compounds according to the invention.

Compound XXIX has values of $\beta$ of $11 \cdot 10^{-30}$ esu at 1907 nm, $39 \cdot 10^{-30}$ esu at 1064 nm, and of $110 \cdot 10^{-30}$ esu at 810 nm. $\lambda_{max}$ and $\lambda_{cut-off}$ are 342 n, and 405 nm, respectively. The value of $\mu_o$ is 6.0 D. The synthesis of compound XXIX is shown in FIG. 6.

a. Preparation of substance XXVII 12.4 g of substance XXVI (0.041 mol, see example 6, step d) is refluxed with 7.3 g of 6-chlorohexanol-1 (0.054 mol) and 1 g of NaI in a mixture of 100 ml ethanol and 50 ml water. After 18 hours of refluxing, the mixture is concentrated by evaporation and poured in water. The resulting suspension is extracted with $2 \times 100$ ml of $CHCl_3$, which is then dried and evaporated, yielding 10.2 g of substance XXVII (0.027 mol, 65%).

b. Preparation of substance XXVIII 10.2 g of substance XXVIII is boiled for 48 hours with 200 ml of concentrated HCl and 200 ml water. After cooling, the residue is filtered and stirred with 15 g of NaOH in 150 ml water and 250 ml toluene. Filtration of the reaction mixture yields the crude product XXVIII.

c. Preparation of substance XXIX

The crude substance XXVIII is refluxed for 24 hours in 100 ml of aceton with 5 ml of $CH_3I$. The reaction mixture is concentrated by evaporation and stirred with a 10% solution of NaOH in water and $CHCl_3$. After 1 hour, the $CHCl_3$ layer is separated, dried and evaporated. The crude product can be recrystallised from a mixture of ethanol and chloroform, yielding 6.2 g of crystals of substance XXIX.

We claim:

1. A device for doubling the frequency of a light wave, in which a fundamental red light wave is passed through a nonlinear optical medium, so as to form a second harmonic blue light wave, which nonlinear optical medium comprises a nonlinear optical compound, comprising an electron donor group an an electron acceptor group which are linked by a $\pi$-conjugated system, in which the electron acceptor group is a sulphone group containing a substituent selected from the group consisting of alkyl, hydroxyalkyl and alkyl(meth)acrylate moieties and in which the compound $\pi$-conjugated system is a biphenylene group.

2. A device according to claim 1, wherein the nonlinear optical medium comprises a polymer matrix, which contains the nonlinear optical compound, which compound is polarly ordered in the polymer matrix.

3. A device according to claim 2, wherein the nonlinear optical compound is bonded to the polymer matrix in a covalent manner.

4. A device according to claim 1, wherein the polymer matrix is a poly(meth)acrylate.

5. A device according to claim 2, wherein the polymer matrix is a poly(meth)acrylate.

* * * * *